United States Patent
Nimura

(10) Patent No.: US 12,411,589 B2
(45) Date of Patent: Sep. 9, 2025

(54) INFORMATION PROCESSING APPARATUS, DISPLAY CONTROL METHOD AND STORAGE MEDIUM

(71) Applicant: CASIO COMPUTER CO., LTD., Tokyo (JP)

(72) Inventor: Ryo Nimura, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 18/101,553

(22) Filed: Jan. 25, 2023

(65) Prior Publication Data
US 2023/0315258 A1    Oct. 5, 2023

(30) Foreign Application Priority Data
Mar. 8, 2022 (JP) .................. 2022-035063

(51) Int. Cl.
*G06F 3/048* (2013.01)
*G06F 3/0482* (2013.01)
*G06F 3/0486* (2013.01)

(52) U.S. Cl.
CPC .......... *G06F 3/0482* (2013.01); *G06F 3/0486* (2013.01)

(58) Field of Classification Search
CPC .. G06F 3/0482; G06F 3/0486; G06F 3/04842; G06F 3/0488
See application file for complete search history.

(56) References Cited

U.S. PATENT DOCUMENTS

| | | | |
|---|---|---|---|
| 8,340,424 B2 | 12/2012 | Sato | |
| 8,572,480 B1* | 10/2013 | Goodwin | G06F 40/131 382/173 |
| 8,588,526 B2 | 11/2013 | Sato | |
| 2014/0282013 A1* | 9/2014 | Amijee | G06F 3/0482 715/732 |
| 2018/0308456 A1 | 10/2018 | Imamura | |
| 2018/0329597 A1* | 11/2018 | Sonnino | G06F 3/0487 |

FOREIGN PATENT DOCUMENTS

| | | |
|---|---|---|
| JP | 2011034204 A | 2/2011 |
| JP | 2011164923 A | 8/2011 |
| JP | 2015014816 A | 1/2015 |
| JP | 2018181182 A | 11/2018 |

OTHER PUBLICATIONS

Japanese Office Action (and an English language translation thereof) dated Feb. 6, 2024, issued in counterpart Japanese Application No. 2022-035063.

* cited by examiner

*Primary Examiner* — Aleksey Olshannikov
(74) *Attorney, Agent, or Firm* — Holtz, Holtz & Volek PC

(57) ABSTRACT

An information processing apparatus includes at least one processor. The processor displays a plurality of objects and a connecting line on a display, the connecting line defining a connection order of the objects as a direction and connecting the objects one to one; receives selection of two or more objects among the plurality of objects; obtains a selection order in which the two or more objects are selected, and controls display of a direction of the connecting line based on the obtained selection order of the two or more objects among the displayed plurality of objects.

5 Claims, 11 Drawing Sheets

INFORMATION PROCESSING APPARATUS, DISPLAY CONTROL METHOD AND STORAGE MEDIUM

REFERENCE TO RELATED APPLICATIONS

This application is based upon and claims the benefit of priority from the prior Japanese Patent Application No. 2022-035063, filed on Mar. 8, 2022, the entire disclosure of which is incorporated herein by reference in its entirety.

TECHNICAL FIELD

The present disclosure relates to an information processing apparatus, a display control method, and a storage medium.

DESCRIPTION OF THE RELATED ART

A known art discloses a method to change the order of thumbnail images that are listed and displayed on a computer.

For example, according to JP2011-164923A, an image forming apparatus changes the order of thumbnail images to the selection order or to the order reverse to the selection order. Specifically, among thumbnail images listed and displayed in an arrangement order, the image forming apparatus determines the continuous range of thumbnail images to be rearranged in a different order, based on user inputs; and the apparatus changes the order of the thumbnail images to the selection order or the order reverse to the selection order, based on selections of thumbnail images one by one within the determined continuous range or selections of the first and the last thumbnail images in the range to be rearranged in the reverse order.

SUMMARY OF THE INVENTION

According to an aspect of the present disclosure, there is provided an information processing apparatus including at least one processor that displays a plurality of objects and a connecting line on a display, the connecting line defining a connection order of the objects as a direction and connecting the objects one to one, receives selection of two or more objects among the plurality of objects, obtains a selection order in which the two or more objects are selected, and controls display of a direction of the connecting line based on the obtained selection order of the two or more objects among the displayed plurality of objects.

According to another aspect of the present disclosure, there is provided an information processing apparatus including at least one processor that displays a plurality of objects and connecting lines on a display, each of the connecting lines defining a connection order of the objects as a direction and connecting the objects one to one, and receives selection of two objects among the plurality of objects, wherein in response to no object being displayed between the selected two objects, the processor obtains a connection order of the two objects connected by a connecting line, changes the connection order, and displays the two objects on the display, wherein in response to another object being displayed between the selected two objects, the processor obtains a connection order of the two objects and the other object connected by the connecting lines, changes the connection order, and displays the two objects and the other object on the display.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, details of first to fifth embodiments of the present invention will be described in order with reference to the attached figures. The embodiments described below are provided with various limitations technically preferable for carrying out the present invention. However, the scope of the present invention is not limited to the embodiments below or illustrated examples.

First Embodiment

Figure 1:
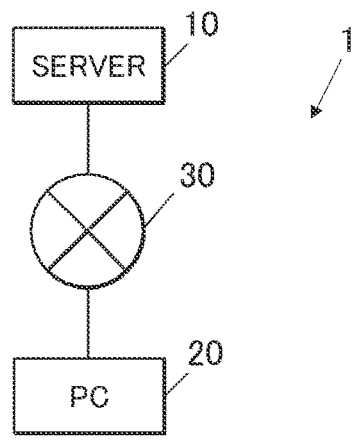
FIG. 1 is a block diagram of a learning support system in an embodiment.
Figure 2:
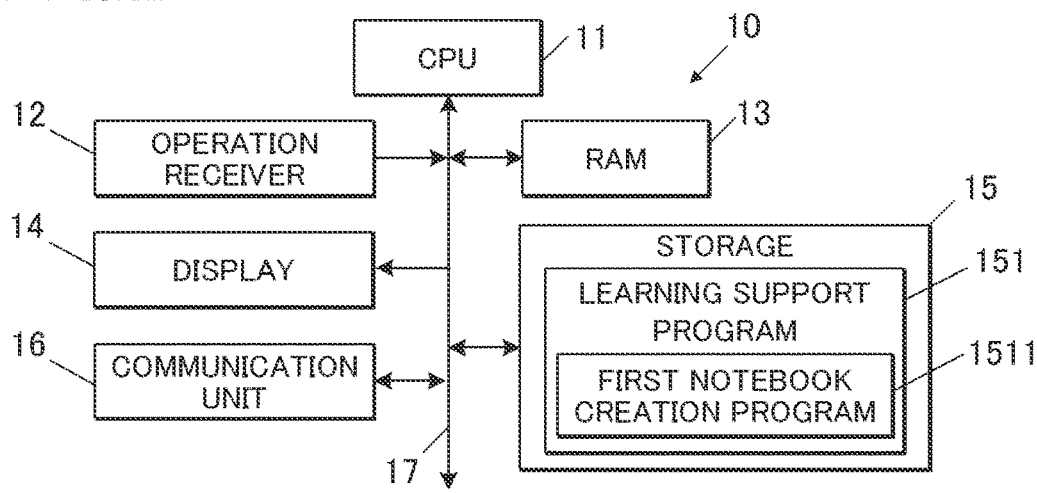
FIG. 2 is a block diagram of an internal configuration of a server.
Figure 3:
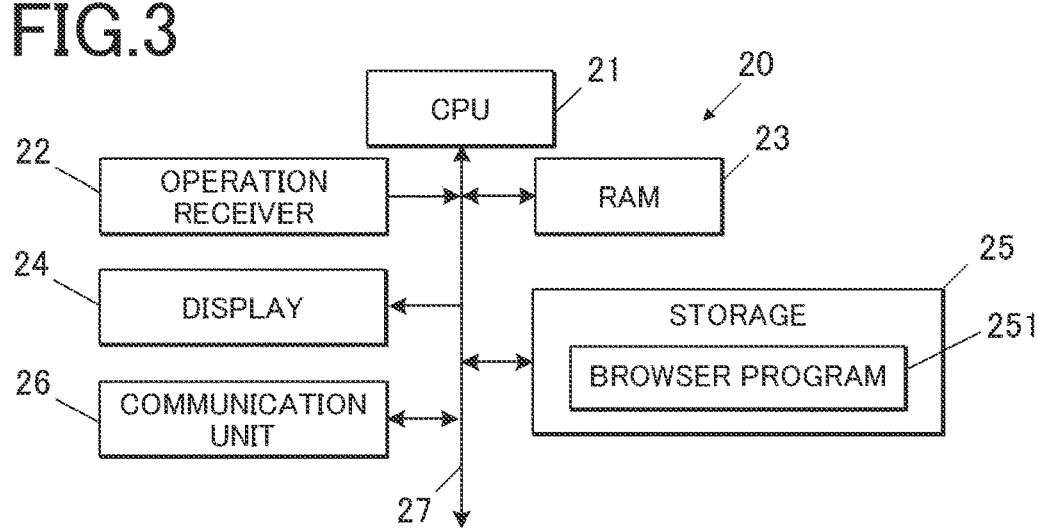
FIG. 3 is a block diagram of an internal configuration of a personal computer (PC)

The first embodiment is described with reference to FIG. 1 to FIG. 5. Firstly, the configuration of this embodiment is described with reference to FIG. 1 to FIG. 3. FIG. 1 is a block diagram showing a learning support system 1 in this embodiment. FIG. 2 is a block diagram showing an internal configuration of a server 10. FIG. 3 is a block diagram showing an internal configuration of a PC 20.

As shown in FIG. 1, the learning support system 1 in this embodiment is a server client system that provides learning support to students who learn at educational institutions, such as elementary schools to high schools. The learning support system 1 includes the server 10 and the PC 20.

The learning support system 1 has the following functions: an administrator support function that supports an administrator of an educational institution in managing account information of teachers and students, class information, and classwork information; a teacher support function that supports teachers of the educational institution in preparing and handing homework/exercises of students and teaching classes; and a learning support function that supports students of the educational institution in creating notebooks of classes, using online dictionaries and mathematical tools, and doing and submitting homework given by the teacher, for example.

Among the functions of the learning support system 1, the learning support function is described in this embodiment. The learning support function is provided to users (students) whose account information (IDs and passwords) have been registered in the server 10.

In particular, creation of a notebook in the learning support function is described. A notebook is a note-type Web component (digital component) to be displayed on the PC 20. The notebook has an area on which a point can be moved to the point at infinity by dragging. The notebook can record information regarding learning, such as learning at classes and home. In particular, sticky notes (iconified images of sticky notes) can be pasted on the notebook.

A sticky note is a Web component (digital component) on which learning contents are recorded in various ways. The shape and size of sticky notes is set such that they can be pasted on the notebook. Herein, the shape of sticky notes is a rectangle as an example but is not limited thereto. The learning contents on a sticky note include text data, image data (still image data, moving image data), handwritten letter data, dictionary data, audio data, various kinds of files, and links to information outside the notebook.

A sticky note can be connected to a different sticky note by a connecting line that defines a direction of order. Therefore, a plurality of sticky notes connected by connecting lines have an order (sequence) according to the directions of the connecting lines. The order of connected sticky notes is used as the order of a slide show function in which sticky notes are displayed in succession at a predetermined time interval or the order of learning schedules of sticky notes, for example. Herein, a connecting line does not branch off. That is, a connecting line connects one sticky note to a different sticky note but does not connect one sticky note to other sticky notes.

The server 10 and the PC 20 are connected for communications via a communication network 30.

The communication network 30 is a network that mediates communications between the server 10 and the PC 20. For example, the communication network 30 is the internet and may also include a local area network (LAN) or a dedicated line.

The server 10 is a Web server apparatus established in the cloud of the communication network 30. The server 10 provides the PC 20 with the learning support function. The PC 20 is an information processing apparatus that is used by a user (student). The PC 20 is a laptop computer, for example, and is used at an educational institution and/or the user's home. The PC 20 is not limited to a laptop but may be a different information processing apparatuses, such as a desktop PC, a tablet PC, and a smartphone. FIG. 1 shows one PC 20 that represents a plurality of PCs 20 used by a plurality of users.

As shown in FIG. 2, the server 10 includes a central processing unit (CPU) 11 (at least one processor, display controlling unit, selection receiving unit, and obtaining unit), an operation receiver 12, a random access memory (RAM) 13, a display 14, a storage 15, and a communication unit 16. These components of the server 10 are conned ted via a bus 17.

The CPU 11 controls the components of the server 10. The CPU 11 reads a program that is specified among various programs stored in the storage 15, loads the program into the RAM 13, and executes various processes in cooperation with the loaded program.

The operation receiver 12 includes a keyboard that has various keys and a pointing device (e.g., mouse) that receives inputs of positions. The operation receiver 12 receives operation inputs by a user, such as key inputs and position inputs, and outputs information on the operation inputs to the CPU 11.

The RAM 13 is a volatile semiconductor memory from which information can be read and on which information can be written. The RAM 13 provides the CPU 11 with a work area and temporarily stores data and programs.

The display 14 includes a display panel, such as a liquid crystal display (LCD) or an electro-luminescence (EL) display. The display 14 displays various kinds of information input by the CPU 11 on the display screen of the display panel.

The storage 15 consists of a hard disk drive (HDD) and/or a solid state drive (SDD) on which information can be written and from which information can be read, for example. The storage 15 stores various kinds of data and programs. In particular, the storage 15 stores a learning support program 151 for the learning support function. The learning support program 151 is not executed by the CPU 11. The learning support program 151 is a program code to be executed on the browser of the PC 20. The browser is a software for connecting to a Web server, receiving data of a Web site, and display the data of the Web site. The learning support program 151 includes a first notebook creation program 1511 for executing a first notebook creation process, which is described later.

The communication unit 16 is a network card to be connected to the communication network 30, for example. In accordance with instructions by the CPU 11, the communication unit 16 sends and receives information to and from external apparatuses (e.g., the PC 20) over the communication network 30. The communication unit 16 is a wired communication unit that is connected to the communication network 30 via a cable/wire but is not limited thereto. The communication unit 16 may be a wireless communication unit that performs wireless communications by being connected to the communication network 30 via a base station or an access point.

As shown in FIG. 3, the PC 20 includes a CPU 21, an operation receiver 22, a RAM 23, a display 24, a storage 25, and a communication unit 26. The components of the PC 20 are connected via a bus 27.

The CPU 21 controls the components of the PC 20. The CPU 21 reads a program specified among various programs stored in the storage 25, loads the program into the RAM 23, and executes various processes in cooperation with the loaded program.

The operation receiver 22 includes a keyboard that has various keys and a pointing device that receives inputs of positions. The operation receiver 22 receives operation inputs by a user (e.g., key inputs and position inputs) and outputs information on the operation to the CPU 21. Herein, the operation receiver 22 includes a mouse as the pointing device. The operation receiver 22 may also include a touchscreen formed on the display panel of the display 24 as one body and receive touch inputs by the user.

The RAM 23 is a volatile semiconductor memory from which information can be read and on which information can be written. The RAM 23 provides the CPU 21 with a work area and temporarily stores data and programs.

The display 24 includes a display panel, such as an LCD or an EL display. The display 24 displays various kinds of information input by the CPU 21 on the display panel.

The storage 25 consists of a HDD and/or an SDD on which information can be written and from which information can be read, for example. The storage 25 stores various kinds of data and programs. In particular, the storage 25 stores a browser program 251 for executing above-described browser function.

The communication unit 26 is a network card to be connected to the communication network 30, for example. In accordance with instructions by the CPU 21, the communication unit 26 sends and receives information to and from external apparatuses (e.g., the server 10) over the communication network 30. The communication unit 26 is a wired communication unit that is connected to the communication network 30 via a cable/wire but is not limited thereto. The communication unit 16 may be a wireless communication unit that performs wireless communications by being connected to the communication network 30 via a base station or an access point.

Figure 4:
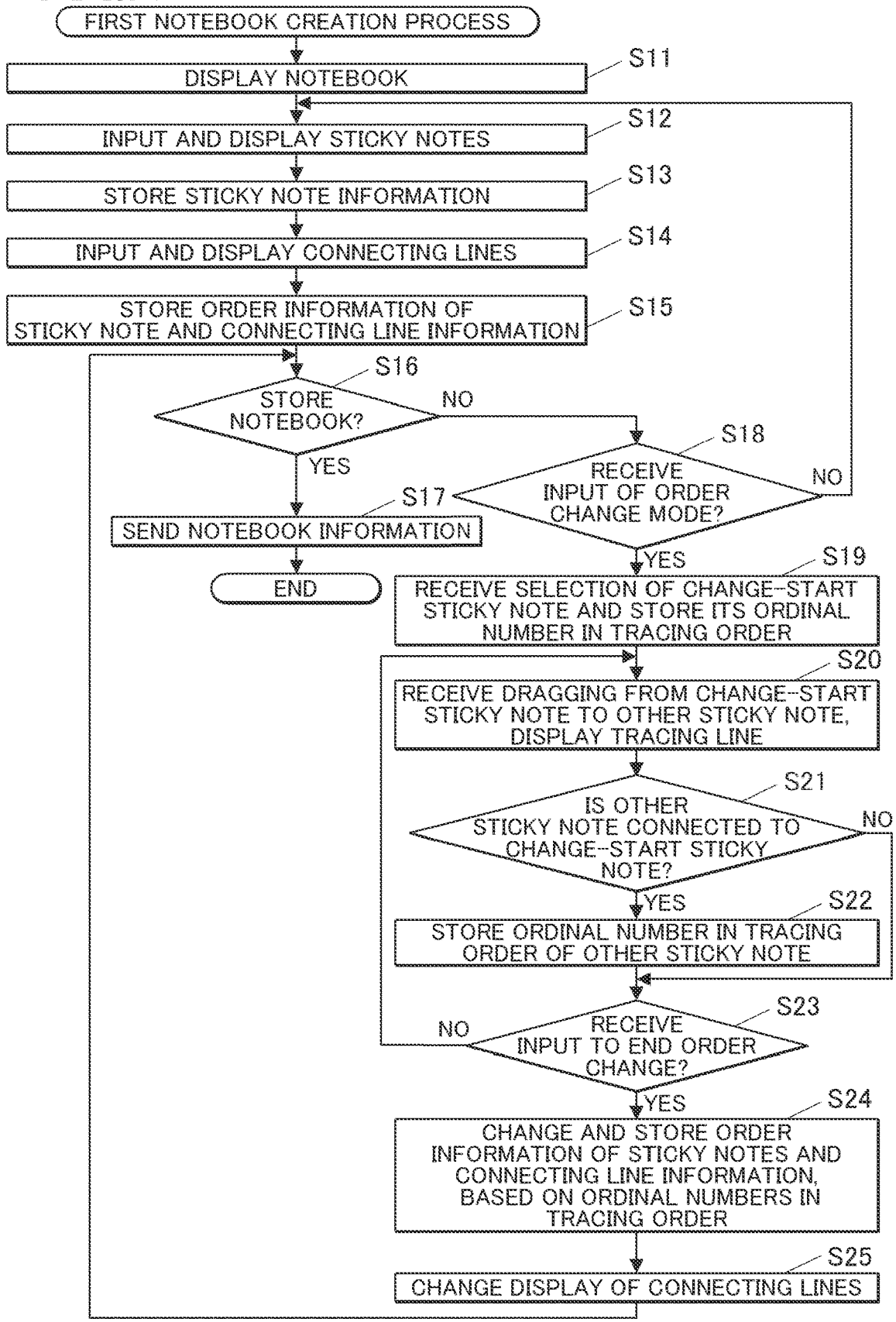
FIG. 4 is a flowchart of a first notebook creation process.
Figure 5A:
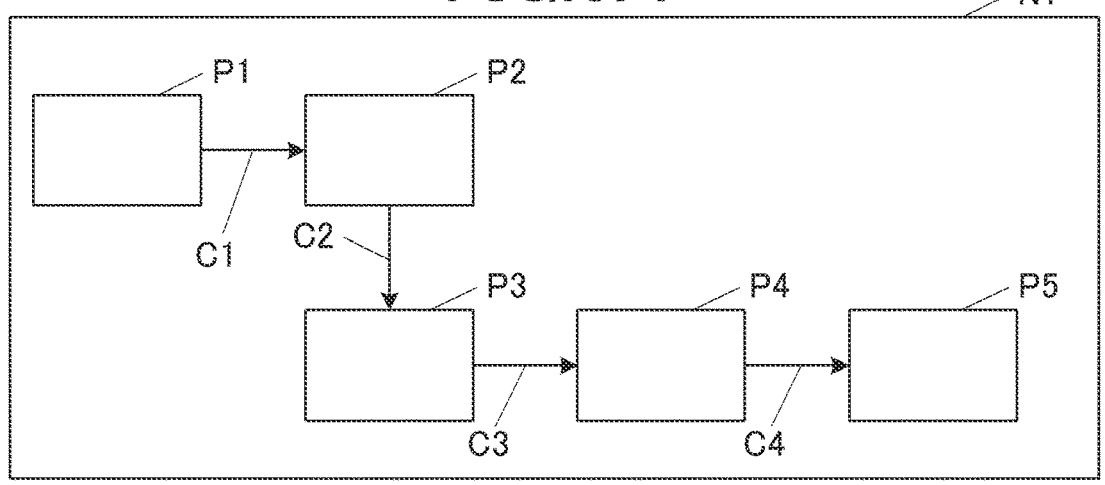
FIG. 5A shows the state of a first notebook before the order of sticky notes is changed, wherein display contents include connected sticky notes and connecting lines.
Figure 5B:
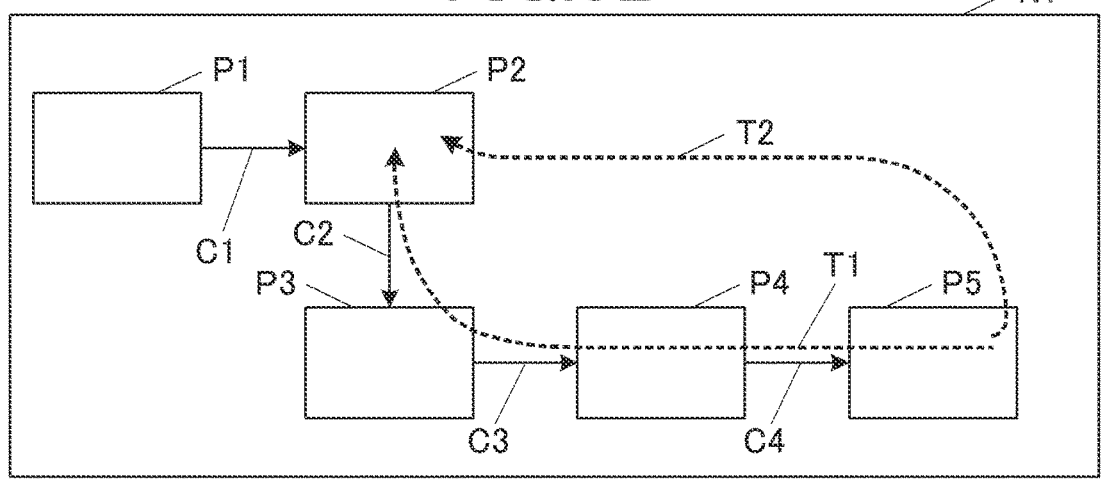
FIG. 5B shows the state where a user is inputting a tracing input, wherein display contents include sticky notes and connecting lines.
Figure 5C:
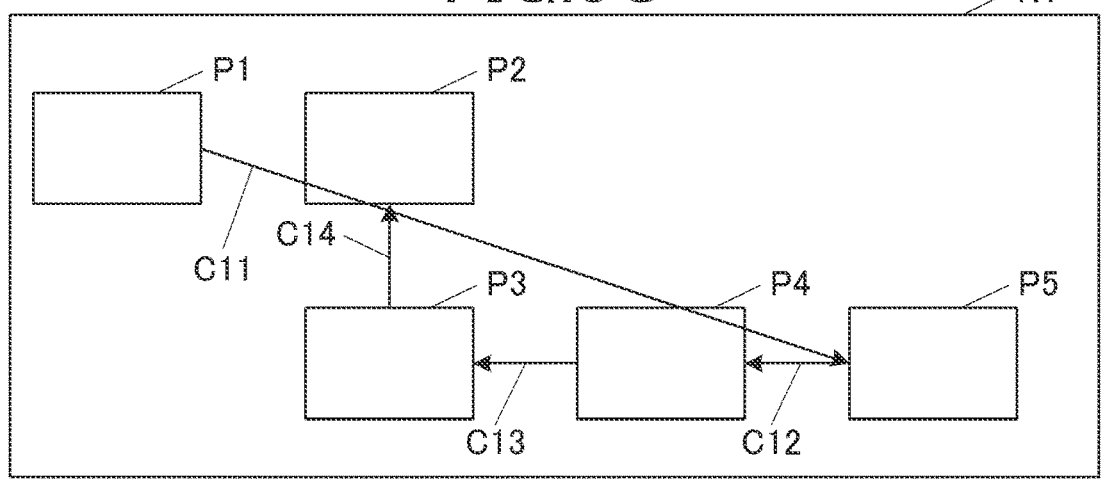
FIG. 5C shows the state after the tracing input in FIG. 5B is done, wherein display contents include sticky notes and changed connecting lines.

Next, the operation of the learning support system 1 in this embodiment is described with reference to FIG. 4 to FIG. 5C. FIG. 4 is a flowchart of the first notebook creation process. FIG. 5A shows the state of a notebook N1 before the order of sticky notes is changed, wherein display contents include connected sticky notes P1 to P5 and connecting lines C1 to C4. FIG. 5B shows the state where the user is inputting a tracing input, wherein display contents include the sticky notes P1 to P5 and connecting lines C1 to C4. FIG. 5C shows the state after the tracing input is done, wherein the display contents include the sticky notes P1 to P5 and changed connecting lines C11 to C14.

In the case described below, the user (student) uses the notebook creation function in the learning support function by using the PC 20 of the learning support system 1. In response to the user of the PC 20 inputting an instruction to execute the browser by manipulating the operation receiver 22, the CPU 21 executes the browser in accordance with the browser program 251.

In response to the user inputting a URL to access the learning support function, which is provided by the server 10, by manipulating the operation receiver 22 while the browser is active on the PC 20, the CPU 21 sends the user's login request to the server 10 via the communication unit 26, based on the input URL.

In response to receiving the login request from the PC 20 via the communication unit 16, the CPU 11 of the server 10 generates log-in window data and sends it to the PC 20 (requester). The CPU 21 of the PC 20 receives the log-in window data from the server 10 via the communication unit 26 and displays the log-in window on the display 24. In response to receiving the user ID and password input by the manipulation of the operation receiver 22 by the user, the CPU 21 sends the input ID and password to the server 10 via the communication unit 26.

In response to receiving the user ID and password from the PC 20 via the communication unit 16, the CPU 11 of the server 10 verifies the login of the user, based on the received ID and password. When the CPU 11 successfully verifies the login of the user, the CPU 11 reads the learning support program 151 from the storage 15 and sends the learning support program 151 to the PC 20, at which the user is authorized to log in, via the communication unit 16.

In response to receiving the learning support program 151 from the server 10 via the communication unit 26, the CPU 21 of the PC 20 executes the learning support program 151 on the browser, thereby performing the learning support process. Thus, the PC 20 performs the learning support process on the browser.

In the learning support process, the CPU 21 receives operation information that is input by the user via the operation receiver 22. Based on the input operation information, the CPU 21 creates a notebook, provides an online dictionary and mathematical tools, and provides classwork support. In the learning support process, the CPU 21 also sends and receives various kinds of information required for the learning support process to and from the server 10 via the communication unit 26. For example, the CPU 21 sends a search request on the online dictionary to the server 10 and receives data of the search result from the server 10.

In response to receiving a request to perform the notebook creation process by the user via the operation receiver 22 while the learning support process is performed by the PC 20, the CPU 21 performs the first notebook creation process in accordance with the first notebook creation program 1511 included in the learning support program 151, which is received from the server 10.

As shown in FIG. 4, the CPU 21 firstly displays the notebook on the display 24 (Step S11). The CPU 21 receives inputs of various kinds of information regarding a sticky note(s) via the operation receiver 22 and, based on the input information, creates a sticky note(s) and displays it on the notebook (Step S12). In Step S12, the information regarding a sticky note is information for creating a sticky note, such as the shape and size, positional information (coordinates on the notebook), and contents information (e.g., text data, image data) of the sticky note. In Step S12, the CPU 21 can also receive inputs of an instruction to delete a displayed sticky note. In the case, the CPU 21 deletes the input sticky note on the notebook.

The CPU 21 stores, in the RAM 23, sticky note information regarding the sticky note created in Step S12 (Step S13). The sticky note information in Step S13 includes identification information for identifying a sticky note; the shape and size, the positional information, and the contents information of the sticky note. When the sticky note is deleted in Step S12, the CPU 21 deletes the corresponding sticky note information in the RAM 23 in Step S13.

The CPU 21 receives inputs of various kinds of information regarding a connecting line(s) that connects a plurality of sticky notes displayed and, based on the input information, creates a connecting line and displays it on the notebook (Step S14). The information regarding the connecting line in Step S14 includes information for creating the connecting line, such as the length, direction, and positional information (coordinates on the notebook) of the connecting line, the line type (e.g., straight or curved), identification information of a sticky note from which the connecting line extends, and identification information of a sticky note at which the connecting line arrives, for example. In Step S14, the CPU 21 can also receive an instruction to delete a displayed connecting line and delete the input connecting line on the notebook.

The CPU 21 stores, in the RAM 23, (i) order information regarding the connection order of sticky notes connected by the connecting line(s) created in Step S14 and (ii) connecting line information regarding the connecting line(s) (Step S15). In Step S15, the order information indicates ordinal numbers of sticky notes created in Step S12 in the connection order of a series of connected sticky notes, which are connected by at least one connecting line. The order information corresponds to the identification information of sticky notes created in Step S12. In Step S15, the connecting line information includes: identification information for identifying the created connecting line; the length, direction, and positional information of the connecting line; line type; identification information of a sticky note from which the connecting line extends; and identification information of a sticky note at which the connecting line arrives, for example. When the connecting line is deleted in Step S14, the CPU 21 deletes the corresponding connecting line information in the RAM 23 in Step S15.

After Step S15, five sticky notes P1, P2, P3, P4 and P5 connected by connecting lines C1, C2, C3, and C4 are shown as a series of connected sticky notes as shown in FIG. 5A, for example. The connecting line C1 connects the sticky note P1 to the sticky note P2 in the direction from P1 to P2. The connecting line C2 connects the sticky note P2 to the sticky note P3 in the direction from P2 to P3. The connecting line C3 connects the sticky note P3 to the sticky note P4 in the direction from P3 to P4. The connecting line C4 connects the sticky note P4 to the sticky note P5 in the direction from P4 to P5.

In the series of connected sticky notes shown in FIG. 5A, the ordinal numbers in the connection order of the sticky notes P1, P2, P3, P4, and P5 are 1, 2, 3, 4, and 5, respectively.

The CPU 21 determines whether an instruction to store the notebook in the server 10 is input by the user via the operation receiver 22 (Step S16). When determining that an instruction to store the notebook is input (Step S16: YES), the CPU 21 generates notebook information that corresponds to the displayed notebook containing the sticky notes and connecting lines, and sends the notebook information to the server 10 via the communication unit 26 (Step S17). The notebook information includes the sticky note information, the order information, and the connecting line information stored in the RAM 23. The CPU 21 then ends the first notebook creation process.

In response to Step S17, the CPU 11 of the server 10 receives the notebook information from the PC 20 via the communication unit 16 and stores it in the storage 15. When requested by the PC 20, the CPU 11 reads out the stored notebook information from the storage 15 and sends the notebook information to the PC 20 (requester), so that the display 24 of the PC 20 can display the notebook information. In the first notebook creation process, the CPU 21 may request notebook information of a created notebook, which is to be displayed and edited, to the server 10 via the communication unit 26 and receive the notebook information; in Step S1*l*, the CPU 21 may display the notebook corresponding to the received notebook information on the display 24; and the CPU 21 may store the notebook information in the RAM 23, for example.

When determining that the instruction to store the notebook is not input (Step S16: NO), the CPU 21 determines whether the user makes an input to perform the order change mode via the operation receiver 22 (Step S18). In the order change mode, the order of any sticky notes in the series of connected sticky notes is changed. In the order change mode, the sticky notes are not moved on the notebook by dragging.

When determining that the user does not make an input to perform the order change mode (Step S18: NO), the CPU 21 proceeds to Step S12. When determining that the user makes an input to perform the order change mode (Step S18: YES), the CPU 21 sets the order change mode; starts receiving a tracing input by the user via the operation receiver 22; receives selection of a sticky note from which the order of sticky notes changes (hereinafter called a change-start sticky note) among the displayed series of connected sticky notes; and stores, in the RAM 23, the ordinal number in the tracing order of the selected change-start sticky note in association with the identification information of the change-start sticky note (Step S19). Herein, the selection of the change-start sticky note is made by dragging the mouse.

In Step S19, the tracing input refers to tracing sticky notes in an order different from the current order by dragging. The sticky notes to be traced are targets of order change among the displayed series of connected sticky notes. For example, consider a case where the series of sticky notes P1, P2, P3, P4, and P5 are connected in this order and the order of P2, P3, P4, and P5 is to be changed to the order of P5, P4, P3, and P2. In this case, the sticky notes are traced (tracing input is done) in the order of P5, P4, P3, and P2, as shown in FIG. 5B. In this case, the change-start sticky note is P5, and its place (ordinal number) in the tracing order is 1.

The CPU 21 receives the user's tracing input (dragging input) moving from the change-start sticky note, which is dragged (traced) in Step S19, to a different sticky note, and displays the tracing line on the notebook (Step S20). The CPU 21 determines whether the different sticky note, which is traced in Step S20, is connected to the change-start sticky note by at least one connecting line (Step S21).

When determining that the different sticky note is connected to the change-start sticky note by at least one connecting line (Step S21: YES), the CPU 21 stores, in the RAM 23, the ordinal number in the tracing order of the different sticky note in association with the identification information of the different sticky note (Step S22). In Step S22, the ordinal number in the tracing order of the different sticky note is +1 to the ordinal number of a sticky note that is traced and stored immediately before the different sticky note.

The CPU 21 determines whether the user makes an input to end the order change with the operation receiver 22 (i.e., to end the tracing input by ending the dragging input) (Step S23). When determining that the different sticky note is not connected to the change-start sticky note (Step S21: NO), the CPU 21 proceeds to Step S23. When determining that the user does not make an input to end the order change (Step S23: NO), the CPU 21 proceeds to Step S20.

For example, in Steps S20 to S23, consider a case where the sticky note P4 (different sticky note) is traced after the change-start sticky note P5 among the series of connected sticky notes, as shown on the notebook N1 of FIG. 5B. In this case, the ordinal number in the tracing order of the sticky note P4 is 2. As another example, assume that a different sticky note (not illustrated) that does not constitute the series of connected sticky notes P1 to P5 is traced after the change-start sticky note P5. In this case, the ordinal number in the order of this different sticky note is not changed or counted in the tracing order.

Thus, when the sticky notes are traced in the order of the change-start sticky note P5, P4, P3, and P2, the tracing line T1 is displayed. This allows the user to view the tracing input. It is preferable that the tracing line T1 be displayed differently from the connecting lines so that the user can distinguish the tracing line T1 from the connecting lines. For example, in FIG. 5B, the tracing line T1 is shown as a dashed line so as to be distinguishable from the solid connecting lines. The connecting lines and the tracing line may be differentiated by the type, thickness, and/or color of the lines, for example. It is further preferable that the traced sticky notes be displayed with a certain effect (e.g., displayed in a different color or blinked) so that the user can visually recognize the traced sticky notes.

In the tracing input, there may be sticky notes that are not traced among the series of connected sticky notes, as shown by the tracing line T2. The tracing line T2 traces the change-start sticky note P5 and the sticky note P2 in this order, whereas the tracing line T2 does not trace the sticky notes P3 and P4, which are between P5 and P2. In such a case, the ordinal numbers in the connection order of the traced sticky notes (sticky notes touched by the tracing line) are changed in the order traced (touched), whereas the ordinal numbers in the connection order of not-traced (not-touched) sticky notes are unchanged. That is, the ordinal numbers in the connection order of the not-traced P3 and P4 are unchanged.

When determining that the user makes an input to end the order change (Step S23: YES), the CPU 21 changes the order information of the sticky notes and the connecting line information, based on the order information and the ordinal numbers in the tracing order of the traced sticky notes stored in the RAM 23; and stores the changed order information and connecting line information in the RAM 23 (Step S24). In Step S24, in the sticky note information of the series of connected sticky notes, the CPU 21 changes the order information of the traced sticky notes according to the ordinal numbers in the tracing order. The CPU 21 does not change the positional information of the traced sticky notes but changes the connecting line information of the series of connected sticky notes such that the sticky notes are connected in the changed order.

Based on the order information and connecting line information stored in the RAM 23, the CPU 21 changes the display of the connecting lines without changing the position of each sticky note constituting the series of connected sticky notes (Step S25). The CPU 21 then proceeds to Step S16.

For example, when the sticky notes are traced along the tracing line T1 as shown in FIG. 5B, the connecting lines C1, C2, C3, C4 are changed to connecting lines C11, C12, C13, C14 on the notebook N1 in Steps S24 and S25, whereas the positions of the sticky notes P1 to P5 remain unchanged. The sticky notes are thus connected in the order of P1, P5, P4, P3 and P2.

The connecting line C11 connects the sticky note P1 to the sticky note P5 in the direction from P1 to P5. The connecting line C12 connects the sticky note P5 to the sticky note P4 in the direction from P5 to P4. The connecting line C13 connects the sticky note P4 to the sticky note P3 in the direction from P4 to P3. The connecting line C14 connects the sticky note P3 to the sticky note P2 in the direction from P3 to P2. Each of the connecting lines C11 to C14 connects two connecting-target sticky notes by connecting midpoints of closest side lines of the respective target sticky notes, for example. The connecting line C11 passes over other sticky notes P2 and P4 but may be curved so as not to pass over other sticky notes.

When the sticky notes are traced along the tracing line T2 in FIG. 5B, the connecting lines C1, C2, C3 and C4 are changed and displayed on the notebook N1, whereas the positions of the sticky notes P1 to P5 remain unchanged. The sticky notes are thus connected in the order of P1, P5, P3, P4 and P2. Such a tracing input allows the user to more freely select and input sticky notes in order to change the order of sticky notes.

As described above, according to the first embodiment, the PC 20 includes the CPU 21 that displays a plurality of sticky notes (objects) constituting the series of connected sticky notes and a connecting line on the display 24, the connecting line defining a connection order of the sticky notes as a direction and connecting the sticky notes one to one; receives the tracing input (selection) of two or more sticky notes the order of which is changed, from among the plurality of sticky notes constituting the series of connected sticky notes via the operation receiver 22; obtains the selection order in which the two or more sticky notes are selected; and changes the connection order by the connecting lines such that the two or more objects are connected in the obtained selection order.

According to such a configuration, the CPU 21 changes the connection order by the connecting lines each having a direction, based on the selection order of sticky notes as targets of the order change among the series of connected sticky notes. Thus, the order of sticky notes, which are connected by the connecting lines each having a direction, can be easily changed without deleting or reapplying connecting lines.

The CPU 21 also displays the selection of sticky notes as targets of the order change (tracing line along which the sticky notes are traced) on the display 24. This allows the user to easily view the selected sticky notes the order of which is to be changed.

Second Embodiment

Figure 6:
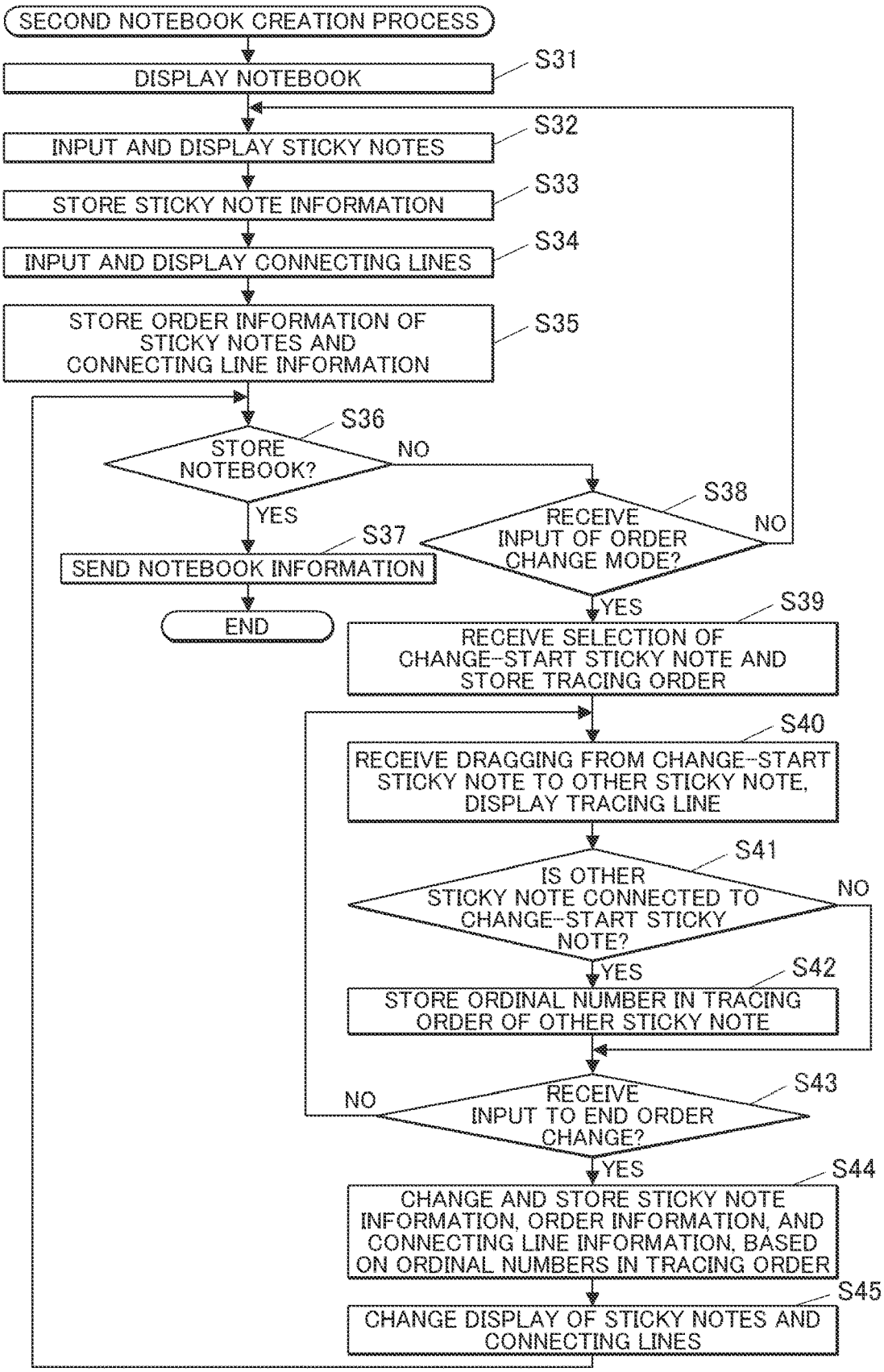
FIG. 6 is a flowchart showing a second notebook creation process.
Figure 7:
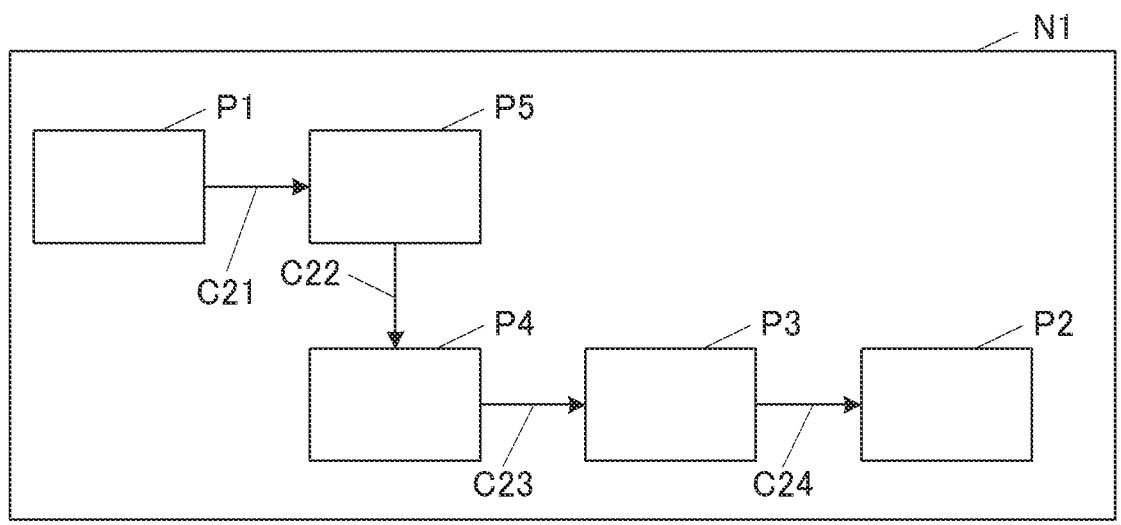
FIG. 7 shows the notebook including changed sticky notes and connecting lines.

The second embodiment is described with reference to FIG. 6 and FIG. 7. FIG. 6 is a flowchart of a second notebook creation process. FIG. 7 shows the notebook N1 that contains changed sticky notes P1 to P5 and connecting lines C21 to C24.

In the first embodiment, in changing the connection order of sticky notes, only the connecting lines are changed and the positions of the displayed sticky notes are unchanged. However, when only the connecting lines are changed, the connecting lines may be jumbled together, which may decrease viewability. In the second embodiment, in changing the connection order of sticky notes, both the connecting lines and the positions of the displayed sticky notes are changed.

The second embodiment uses the learning support system 1 as with the first embodiment. However, the storage 15 of the server 10 stores a second notebook creation program for executing the second notebook creation process (described later), instead of the first notebook creation program 1511 in the learning support program 151.

The operation of the learning support system 1 in this embodiment is described with reference to FIG. 6 and FIG. 7. In the learning support system 1, the CPU 21 of the PC 20 performs the learning support process, as with in the first embodiment. In response to receiving a request to perform the notebook creation process from the user via the operation receiver 22 while the learning support process is performed in the PC 20, the CPU 21 performs the second notebook creation process in accordance with the second notebook creation program included in the learning support program 151, which is received from the server 10.

In FIG. 6, Steps S31 to S43 are the same as Steps S11 to S23 of the first notebook creation process in FIG. 4. When determining that the user makes an input to end the order change (Step S43: YES), the CPU 21 changes the sticky note information, the order information, and connecting line information, based on the sticky note information, the order information, and the tracing order of the sticky notes stored in the RAM 23; and the CPU 21 stores the changed sticky note information, order information, and connecting line information in the RAM 23 (Step S44). In Step S44, in the order information of the series of connected sticky notes, the CPU 21 changes the order information of the traced sticky notes according to the ordinal numbers in the tracing order. The CPU 21 also changes the positional information of the traced sticky notes such that each of the traced sticky notes is placed at the position of the sticky note having the corresponding ordinal number in the previous order (the order before changed). Further, the CPU 21 changes the connecting line information of the series of connected sticky notes such that the sticky notes are connected in the changed order.

The CPU 21 changes the display of the positions of the sticky notes constituting the series of connected sticky notes and the connecting lines, based on the sticky note information, the order information, and the connecting line information stored in the RAM 23 (Step S45). The CPU 21 then proceeds to Step S36.

For example, consider the case where the sticky notes are traced along the tracing line T1 shown in FIG. 5B. In the case, in Steps S44 and S45, the positions of the sticky notes P1, P2, P3, P4, and P5 are changed to the positions before the order change of the sticky notes P1, P5, P4, P3, P2, respectively; and the connecting lines C1, C2, C3, C4 are changed to connecting lines C21, C22, C23, C24, so that the sticky notes are connected in the order of P1, P5, P4, P3 and P2, as shown in the notebook N1 in FIG. 7.

The connecting line C21 connects the sticky note P1 to the sticky note P5 in the direction from P1 to P5. The connecting line C22 connects the sticky note P5 to the sticky note P4 in the direction from P5 to P4. The connecting line C23 connects the sticky note P4 to the sticky note P3 in the direction from P4 to P3. The connecting line C24 connects the sticky note P3 to the sticky note P2 in the direction from P3 to P2. Each of the connecting lines C21 to C24 connects two connecting-target sticky notes by connecting midpoints of closest side lines of the respective target sticky notes, for example.

As described above, according to the second embodiment, the CPU 21 rearranges sticky notes as targets of the order change in the selection order in which the stick notes are selected, the selection order being obtained via the operation receiver 22. Such a configuration can avoid overlapping of sticky notes and connecting lines, as compared with a configuration in which only the connecting lines are changed. Thus, the user can easily view the connection order of sticky notes and connecting lines.

Third Embodiment

Figure 8:
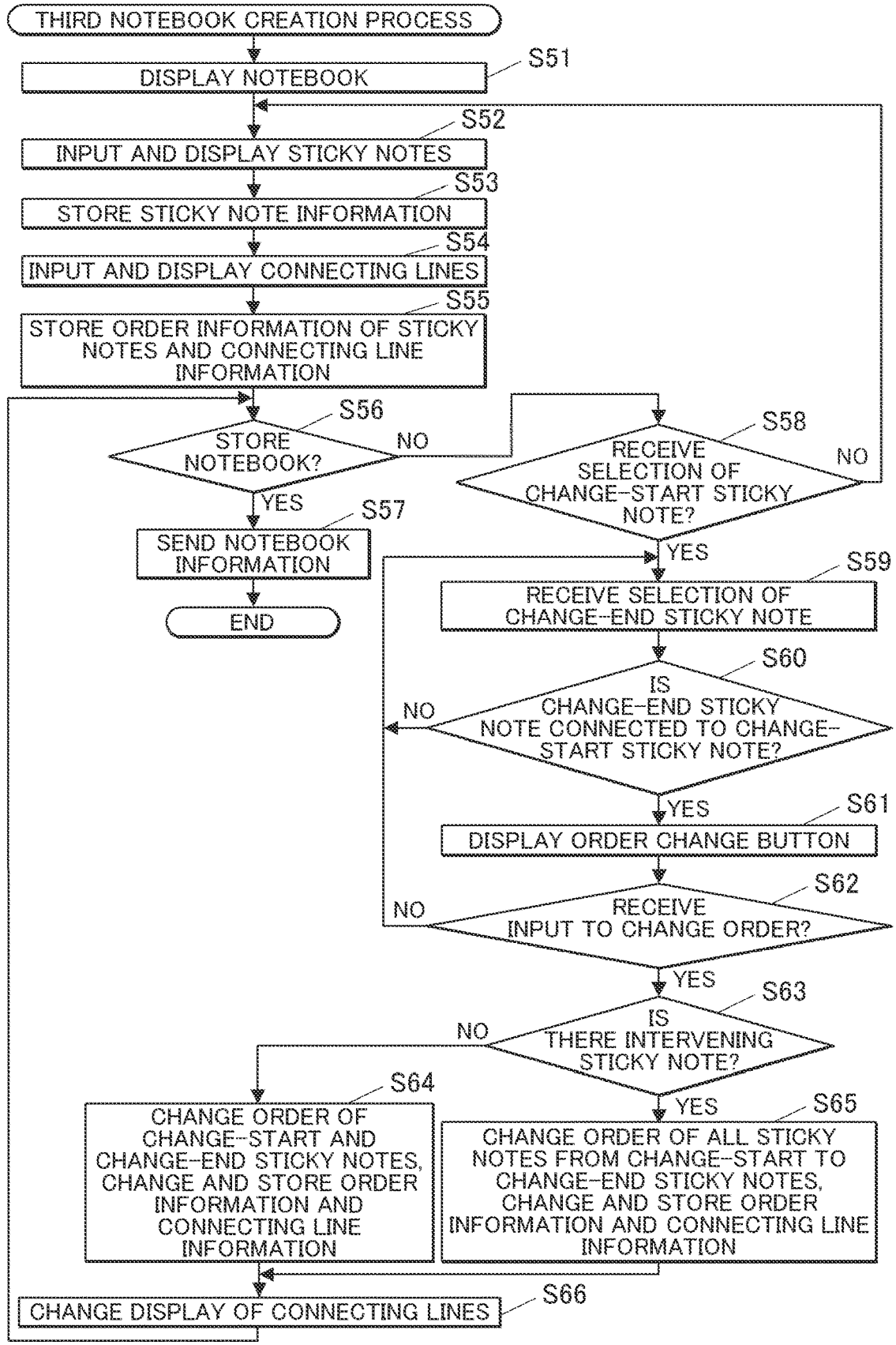
FIG. 8 is a flowchart showing a third notebook creation process.
Figure 9:
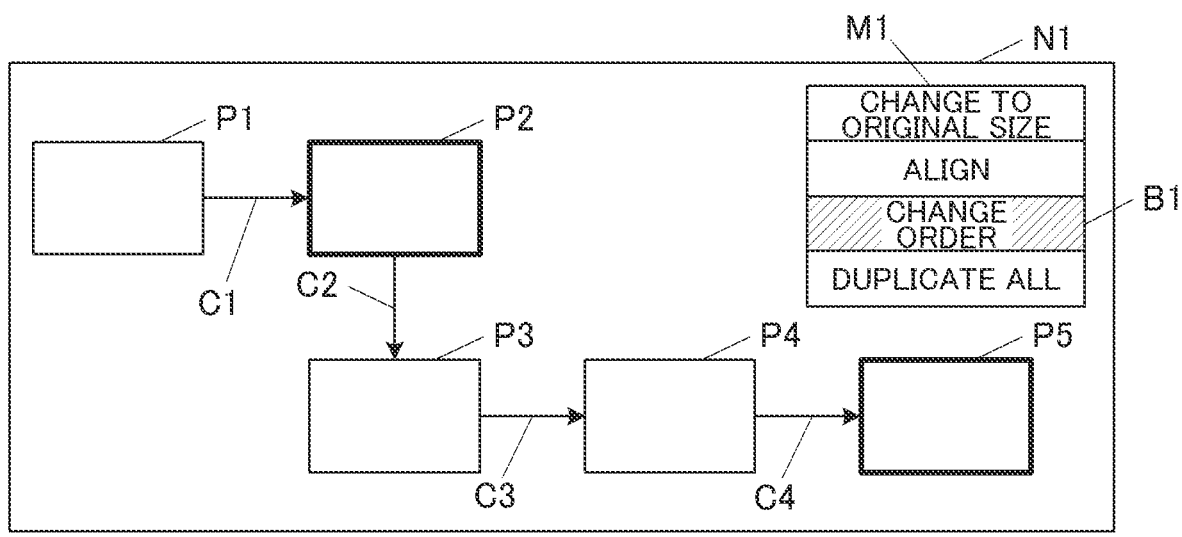
FIG. 9 shows the state where the user selects a change-start sticky note and a change-end sticky note, wherein display contents include sticky notes and connecting lines.

The third embodiment is described with reference to FIG. 8 and FIG. 9. FIG. 8 is a flowchart showing a third notebook creation process. FIG. 9 shows the state where the user selects the sticky note P2 as the change-start sticky note and selects P5 as the change-end sticky note, wherein displayed contents of the notebook N1 include the sticky notes P1 to P5 and connecting lines C1 to C4.

In the first and second embodiments, in changing the connection order of sticky notes, the sticky notes as targets of the order change are selected by the tracing input. On the other hand, in the third embodiment, in changing the connection order of sticky notes, the sticky notes as targets of the order change are selected by selecting the start and the end of the sticky notes as targets of the order change.

The third embodiment uses the learning support system 1 as with the first embodiment. However, the storage 15 of the server 10 stores a third notebook creation program for executing a third notebook creation process (described later), instead of the first notebook creation program 1511 in the learning support program 151.

The operation of the learning support system 1 in this embodiment is described with reference to FIG. 8 and FIG. 9. In the learning support system 1, the CPU 21 of the PC 20 performs the learning support process, as with in the first embodiment. In response to receiving a request to perform the notebook creation process from the user via the operation receiver 22 while the learning support process is performed in the PC 20, the CPU 21 performs the third notebook creation process in accordance with the third notebook creation program included in the learning support program 151, which is received from the server 10.

In FIG. 8, Steps S51 to S57 are the same as Steps S11 to S17 of the first notebook creation process in FIG. 4. When determining that the instruction to store the notebook is not input (Step S56: NO), the CPU 21 determines whether the user makes an input, with the operation receiver 22, to select the change-start sticky note among the series of connected sticky notes (Step S58). For example, the CPU 21 determines whether the user presses the control key of the keyboard while dragging the mouse of the operation receiver 22 to select a plurality of sticky notes. When determining that the user does not make an input to select the change-start sticky note (Step S58: NO), the CPU 21 proceeds to Step S52.

When determining that the user makes an input to select the change-start sticky note (Step S58: YES), the CPU 21 receives the user's input with the operation receiver 22 to select the change-end sticky note among the series of connected sticky notes (Step S59). For example, the CPU 21 receives the user's operation of pressing the control key of the keyboard while dragging the mouse of the operation receiver 22. The change-end sticky note is the last sticky note in the sticky notes as targets of the order change, among the series of connected sticky notes. The order of sticky notes from the change-start sticky note to the change-end sticky note is reversed.

The CPU 21 determines whether the change-end sticky note, which is selected in Step S59, is connected to the change-start sticky note by at least one connecting line (Step S60). When the change-end sticky note is not connected to the change-start sticky note (Step S60: NO), the CPU 21 proceeds to Step S59.

When the change-end sticky note is connected to the change-start sticky note (Step S60: YES), the CPU 21 displays an order change button on the display 24 (Step S61). The order change button is for changing the order of sticky notes from the change-start sticky note to the change-end sticky note. The CPU 21 determines whether the user makes an input to change the order of sticky notes from the change-start sticky note to the change-end sticky note by clicking the order change button displayed in Step S61 with the operation receiver 22 (Step S62). When determining that the user does not make an input to change the order of sticky notes (Step 362: NO), the CPU 21 proceeds to Step S59.

For example, in Steps S58 to S62, consider the case where the order of the series of connected sticky notes P1 to P5 on the notebook N1 shown in FIG. 5A is changed. In the case, the change-start sticky note P2 is selected in Step S58; the change-end sticky note P5 is selected in Step S59; the order change button B1 is displayed in a menu M1 in Step S61 since the change-start sticky note P2 is connected to the change-end sticky note P5 via the connecting lines C2 to C4; and a click of the order change button B1 is received in Step S62, as shown in FIG. 9.

When determining that the user makes an input to change the order of sticky notes (Step S62: YES), the CPU 21 determines whether there is an intervening sticky note(s) between the change-start sticky note and the change-end sticky note (Step S63).

When determining that there is no intervening sticky note between the change-start sticky note and the change-end sticky note (Step S63: NO), the CPU 21 changes the order information and the connecting line information such that the order of the change-start sticky note and the change-end sticky note is reversed, based on the order information and sticky note information (identification information) of the change-start sticky note and the change-end sticky note stored in the RAM 23; and the CPU 21 stores the changed order information and connecting line information in the RAM 23 (Step S64). In Step S64, the CPU 21 changes the order information of the change-start sticky note and change-end sticky note among the series of connected sticky notes. The CPU 21 does not change the positional information of the change-start sticky note and the change-end sticky note but changes the connecting line information of the connecting lines connecting the series of connected sticky notes such that the sticky notes are connected in the changed order.

When determining that there is an intervening sticky note(s) between the change-start sticky note and the change-end sticky note (Step S63: YES), the CPU 21 changes the order information and the connecting line information of the sticky notes such that the order of all the sticky notes from the change-start sticky note to the change-end sticky note are changed, based on the order information and sticky note information (identification information) of all the sticky notes from the change-start sticky note to the change-end sticky note in the RAM 23; and the CPU 21 stores the changed order information and connecting line information in the RAM 23 (Step S65). In Step S65, the CPU 21 changes the order information of all the sticky notes from the change-start sticky note to the change-end sticky note among the series of connected sticky notes. The CPU 21 does not change the positional information of the sticky notes from the change-start sticky note to the change-end sticky note but changes the connecting line information of the connecting lines that connect the series of connected sticky notes such that the sticky notes are connected in the changed order.

Based on the order information and connecting line information stored in the RAM 23, the CPU 21 changes the display of the connecting lines without changing the positions of the respective sticky notes in the series of connected sticky notes (Step S66). The CPU 21 then proceeds to Step S56.

In Steps S65 and S66, consider the case where the sticky note P2 is selected as the change-start sticky note and the sticky note P5 is selected as the change-end sticky note, as shown in FIG. 9. In the case, the connecting lines C1, C2, C3, C4 are changed to connecting lines C11, C12, C13, C14 on the notebook N1 such that the sticky notes are connected in the order of P1, P5, P4, P3 and P2, whereas the positions of the sticky notes P1 to P5 are not changed, as shown in FIG. 5C.

As described above, according to the third embodiment, the PC 20 includes the CPU 21 that displays a plurality of sticky notes (objects) constituting the series of connected sticky notes and connecting lines on the display 24, each of the connecting line defining a connection order of the sticky notes as a direction and connecting the sticky notes one to one, and receives selection of the change-start sticky note and the change-end sticky note among the plurality of sticky notes via the operation receiver 22. In response to determining that no sticky note is displayed between the change-start sticky note and the change-end sticky note, the CPU 21 obtains the connection order of the change-start sticky note and the change-end sticky note connected by a connecting line having a direction (order information of the sticky notes and connection line information), changes the connection order by the connecting line, and displays the change-start sticky note and the change-end sticky note on the display 24. In response to determining that another sticky note is displayed between the change-start sticky note and the change-end sticky note, the CPU 21 obtains the connection order of the change-start sticky note, the change-end sticky note, and the other sticky note connected by connecting lines each having a direction, changes the connection order by the connecting lines, and displays the change-start sticky note, the change-end sticky note, and the other sticky note on the display 24.

According to such a configuration, the CPU 21 changes the connection order of sticky notes from the change-start sticky note to the change-end sticky note, which are connected by connecting lines having directions, based on the selection of the change-start sticky note and the change-end sticky note among the series of connected sticky notes. Thus, the order of sticky notes connected by connecting lines having directions can be easily changed without deleting or reapplying connecting lines.

Fourth Embodiment

Figure 10:
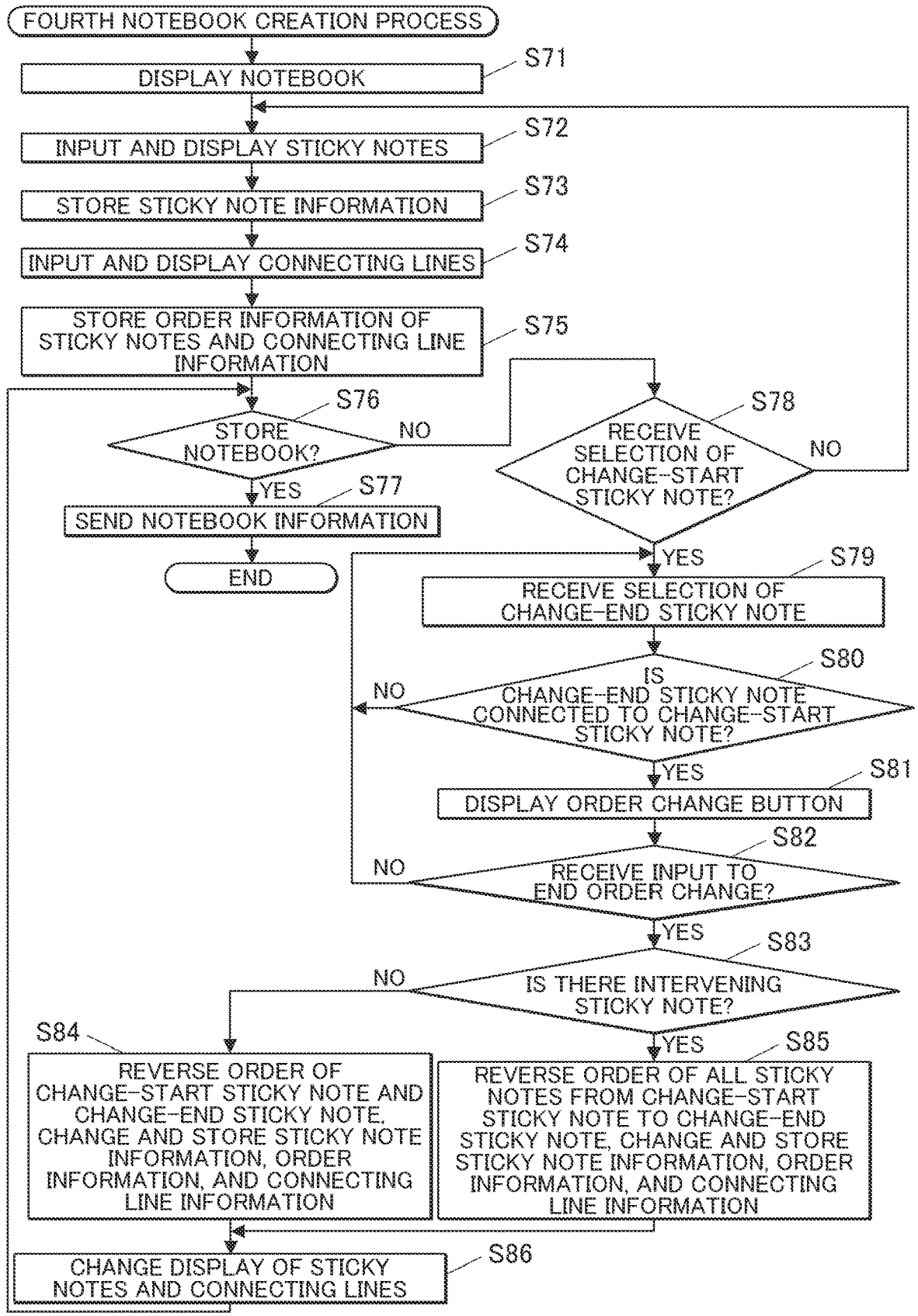
FIG. 10 is a flowchart showing a fourth notebook creation process.

The fourth embodiment of the present invention is described with reference to FIG. 10. FIG. 10 is a flowchart showing a fourth notebook creation process.

The fourth embodiment is the same as the third embodiment in that, in changing the connection of sticky notes, the sticky notes as targets of the order change are selected by selecting the change-start sticky note and the change-end sticky note of the sticky notes as targets of the order change. In addition, in the fourth embodiment, the positions of the displayed sticky notes and the connecting lines are changed.

The fourth embodiment uses the learning support system 1 as with the first embodiment. However, the storage 15 of the server 10 stores a fourth notebook creation program for executing a fourth notebook creation process (described later), instead of the first notebook creation program 1511 in the learning support program 151.

Next, the operation of the learning support system 1 in this embodiment is described with reference to FIG. 10. In the learning support system 1, the CPU 21 of the PC 20 performs the learning support process, as with in the first embodiment. In response to receiving a request to perform the notebook creation process from the user via the operation receiver 22 while the learning support process is performed by the PC 20, the CPU 21 performs the fourth notebook creation process in accordance with the fourth notebook creation program included in the learning support program 151, which is received from the server 10.

In FIG. 10, Steps S71 to S83 are the same as Steps S51 to S63 of the third notebook creation process in FIG. 8.

When there is no intervening sticky note between the change-start sticky note and the change-end sticky note (Step S83: NO), the CPU 21 changes sticky note information, order information, and connecting line information of sticky notes such that the order and positions of the change-start sticky note and the change-end sticky note are changed, based on the order information and sticky note information (identification information and positional information) of the change-start sticky note and the change-end sticky note stored in the RAM 23; and the CPU 21 stores the changed sticky note information, order information, and connecting line information in the RAM 23 (Step S84). In Step S84, the CPU 21 changes the order information of the change-start sticky note and the change-end sticky note among the series of connected sticky notes; the CPU 21 also changes the positional information of the change-start and change-end sticky notes such that each of the sticky notes is placed at the position of the sticky note having the corresponding ordinal number in the previous order (the order before being changed). Further, the CPU 21 changes the connecting line information of the connecting lines that connect the series of connected sticky notes such that the sticky notes are connected in the changed order.

When determining that there is an intervening sticky note(s) between the change-start sticky note and the change-end sticky note (Step S83: YES), the CPU 21 changes sticky note information, order information, and connecting line information such that the order of all the sticky notes from the change-start sticky note to the change-end sticky note are reversed, based on order information and sticky note information (identification information and positional information) of all the sticky notes from the change-start sticky note to the change-end sticky note in the RAM 23; and the CPU 21 stores the changed sticky note information, order information, and connecting line information in the RAM 23 (Step S65). In Step S65, in the sticky note information of the series of connected sticky notes, the CPU 21 changes the positional information such that (i) the order of all the sticky notes from the change-start sticky note to the change-end sticky note is changed and (ii) each of all the sticky notes is placed at the position of the sticky note having the corresponding ordinal number in the previous order (the order before being changed). Further, in Step S65, the CPU 21 changes the connecting line information of the series of connected sticky notes such that the sticky notes are connected in the changed order.

Based on the sticky note information, order information, and connecting line information stored in the RAM 23, the CPU 21 changes the displayed connecting lines and positions of the sticky notes constituting the series of connected sticky notes (Step S86). The CPU 21 then proceeds to Step S76.

For example, consider the case where (i) the order of the sticky notes P1 to P5 constituting the series of connected sticky notes is changed on the notebook N1 shown in FIG. 5A and (ii) P2 is selected as the change-start sticky note and P5 is selected as the change-end sticky note, as shown in FIG. 9. In the case, in Steps S84 and S85, the sticky notes P1, P2, P3, P4 and P5 on the notebook N1 are moved to the positions before the order change of the sticky notes P1, P5, P4, P3, and P2, respectively, as shown in FIG. 7. Further, the connecting lines C1, C2, C3, C4 are changed to connecting lines C21, C22, C23, C24 as shown in FIG. 7 so that the sticky notes are connected in the order of P1, P5, P4, P3, and P2.

As described above, according to the fourth embodiment, the CPU 21 rearranges (i) the change-start sticky note and the change-end sticky note or (ii) the change-start sticky note, the change-end sticky note, and the other intervening sticky note, such that the sticky notes as targets of order change among the series of connected sticky notes are connected in the selection order, in which the change-start and change-end sticky notes are selected and which are obtained via the operation receiver 22. Such a configuration can avoid overlapping of sticky notes and connecting lines as compared with a configuration in which only the connecting lines are changed. This allows the user to easily view the connection order of sticky notes and connecting lines.

Fifth Embodiment

Figure 11:
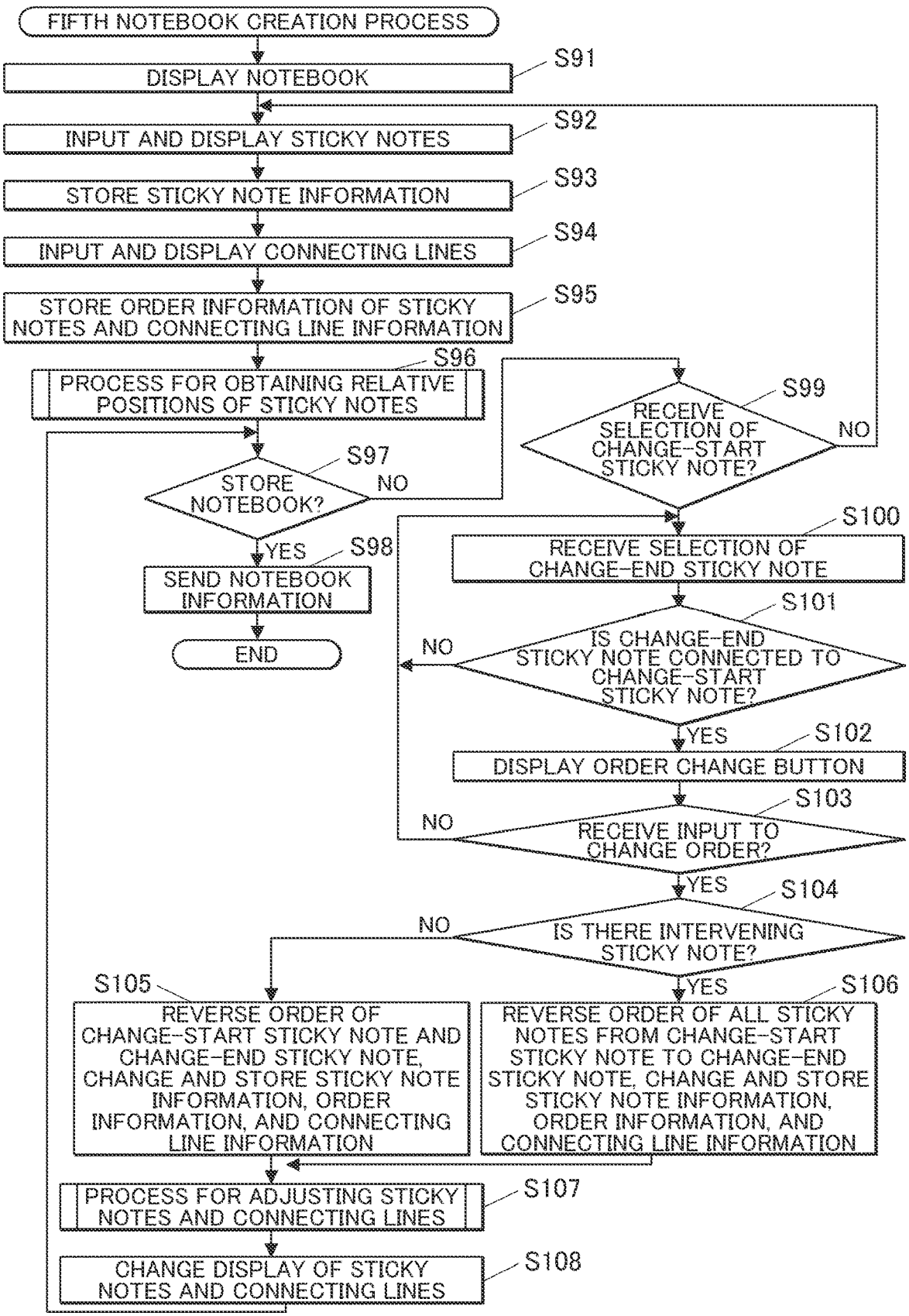
FIG. 11 is a flowchart showing a fifth notebook creation process.
Figure 12:
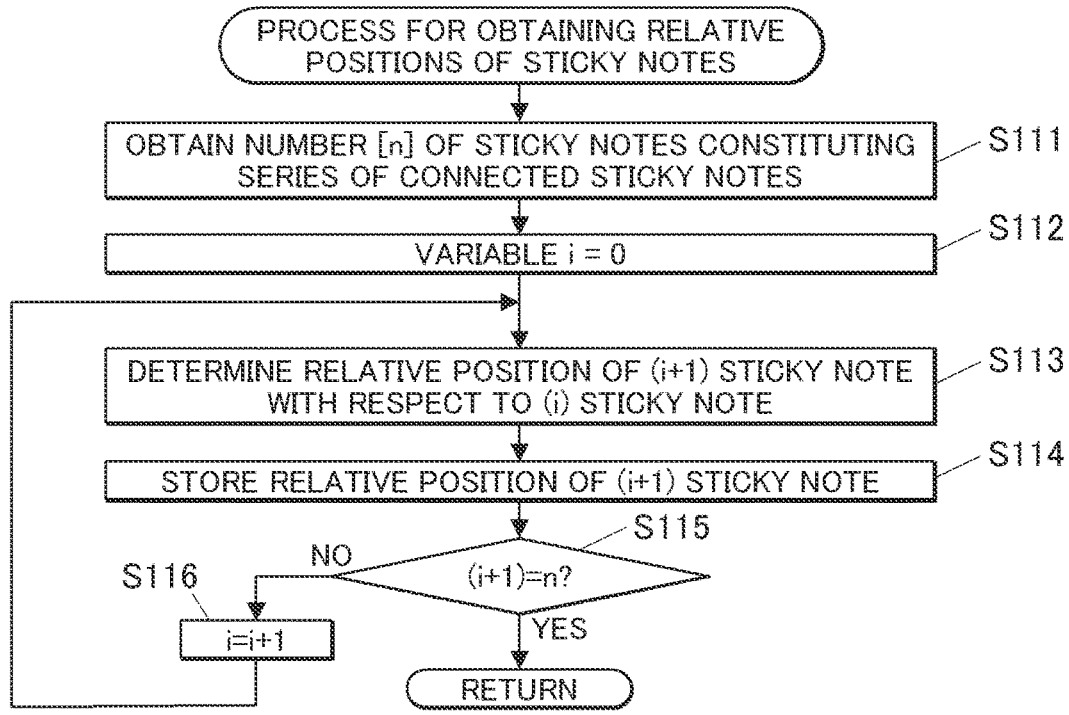
FIG. 12 is a flowchart of a process for obtaining relative positions of sticky notes.
Figure 13:
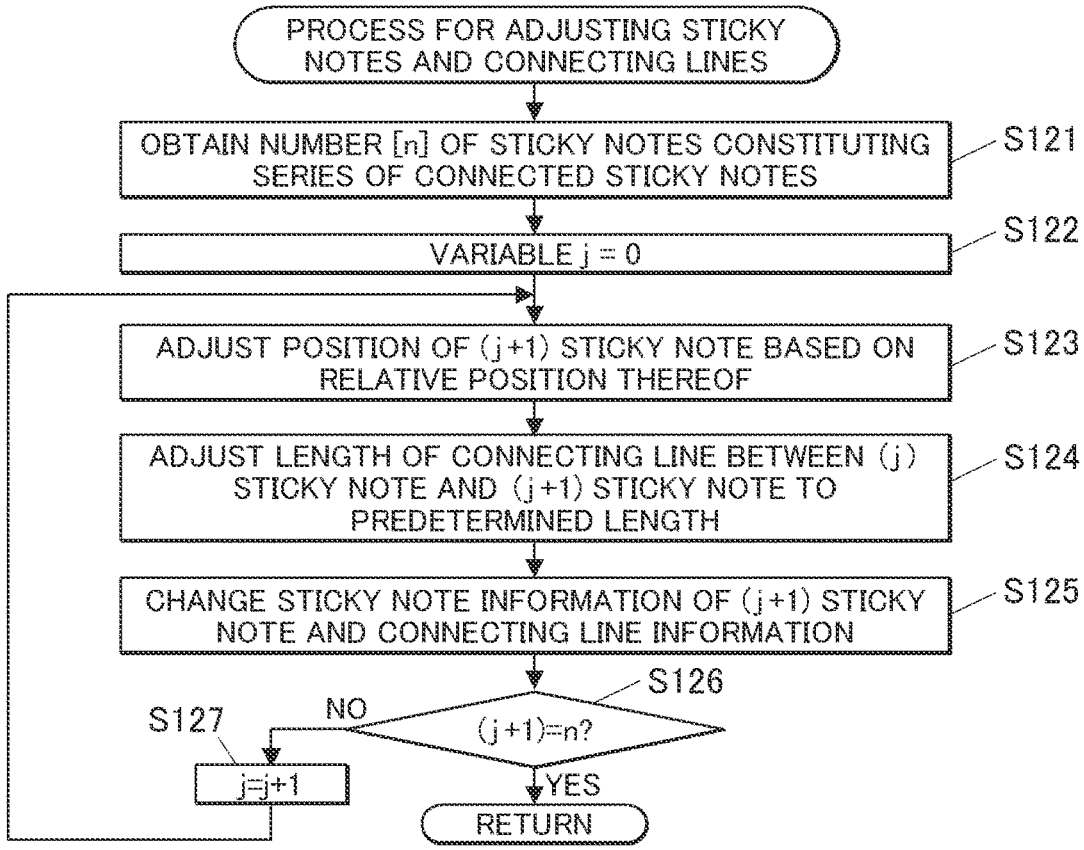
FIG. 13 is a flowchart of a process for adjusting sticky notes and connecting lines.
Figure 14:
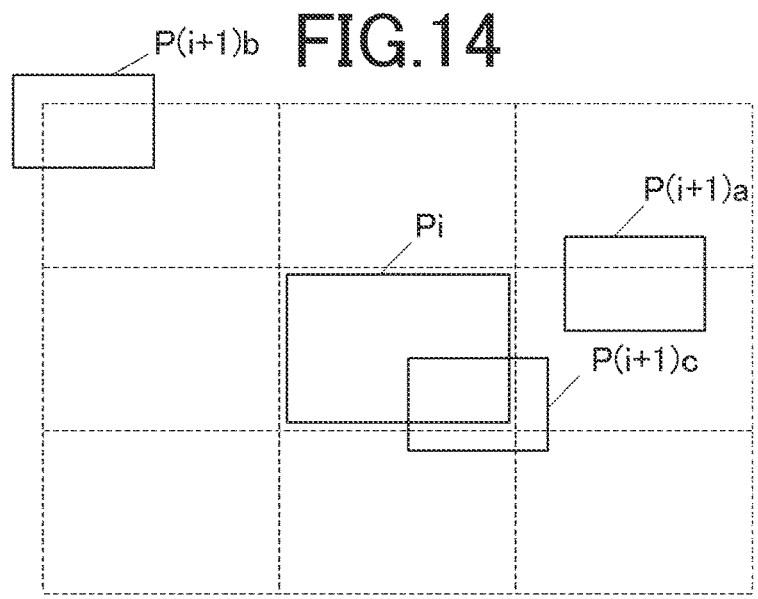
FIG. 14 shows relative positions of sticky notes.
Figure 15A:
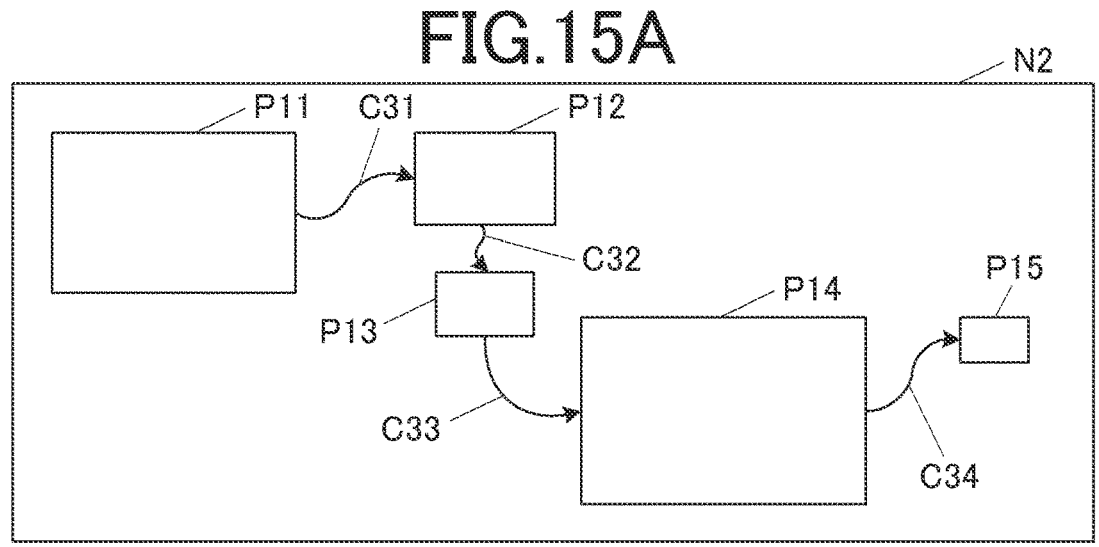
FIG. 15A shows the state before the user changes the order of sticky notes, wherein display contents include connected sticky notes and connecting lines.
Figure 15B:
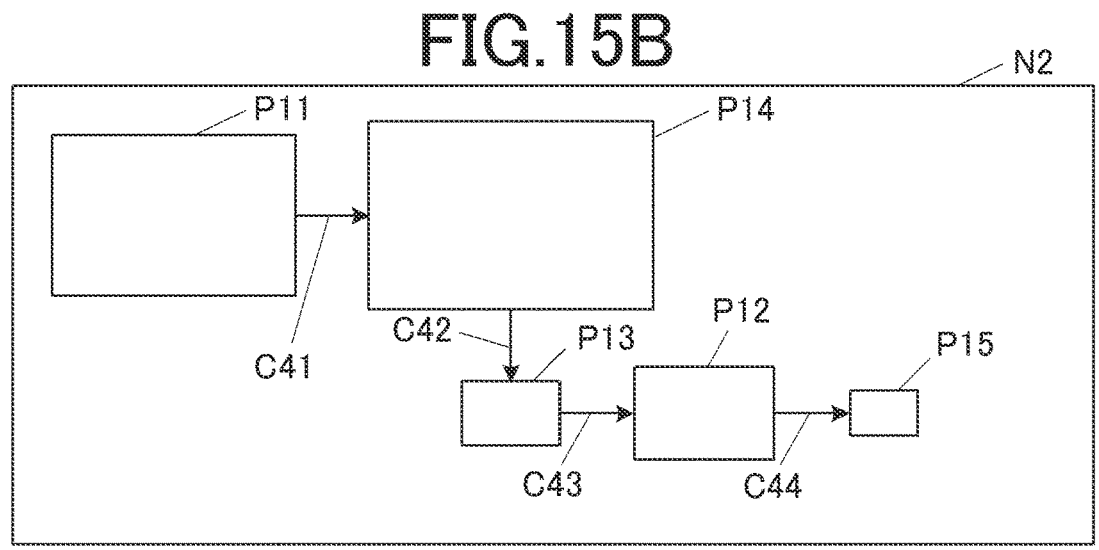
FIG. 15B shows the state after the user changes the order of sticky notes, wherein display contents include connected sticky notes and connecting lines.

A fifth embodiment of the present invention is described with reference to FIG. 11 to FIG. 15B. FIG. 11 is a flowchart showing a fifth notebook creation process. FIG. 12 is a flowchart showing the process for obtaining relative positions of sticky notes. FIG. 13 is a flowchart showing the process for adjusting sticky notes and connecting lines. FIG. 14 shows relative positions of sticky notes; FIG. 15A shows the state of a notebook N2 before the user changes the order of sticky notes, wherein display contents of the notebook N2 include sticky notes P11 to P15 connected to each other and connecting lines C31 to C34. FIG. 15B shows the state of the notebook N2 after the user changes the order of sticky notes, wherein display contents of the notebook N2 include sticky notes P11 to P15 connected to each other and connecting lines C41 to C44.

In the second and fourth embodiments, in changing the connection order of sticky notes, the connecting lines and the positions of displayed sticky notes are changed. However, according to these embodiments, displayed sticky notes may overlap with each other after their order is changed, depending on the shape and size of the sticky notes. As a result, either of the sticky notes may be partly or entirely covered and hidden. To address this issue, in changing the connection order of sticky notes, the fifth embodiment performs a process to adjust and change connecting lines and positions of sticky notes the order of which is changed such that the displayed sticky notes do not overlap with each other.

The fifth embodiment uses the learning support system 1 as with the first embodiment. However, the storage 15 of the server 10 stores a fifth notebook creation program for executing a fifth notebook creation process (described later), instead of the first notebook creation program 1511 in the learning support program 151.

The operation of the learning support system 1 in the fifth embodiment is described with reference to FIG. 11 to FIG. 15B. In the learning support system 1, the CPU 21 of the PC 20 performs the learning support process, as with in the first embodiment. In response to receiving a request to perform the notebook creation process from the user via the operation receiver 22 while the learning support process is performed by the PC 20, the CPU 21 performs the fifth notebook creation process in accordance with the fifth notebook creation program included in the learning support program 151, which is received from the server 10.

In FIG. 11, Steps S91 to S95 are the same as Steps S71 to S75 of the fourth notebook creation process in FIG. 10. The CPU 21 performs the process for obtaining relative positions of sticky notes (Step S96). In the process, the CPU 21 obtains the relative positions of sticky notes constituting the series of connected sticky notes being displayed. The process for obtaining relative positions of sticky notes is described with reference to FIG. 12.

As shown in FIG. 12, the CPU 21 obtains the number n [n: an integer] of sticky notes constituting the displayed series of connected sticky notes (Step S111). The number of sticky notes is obtained as the number of pieces of identification information in the sticky note information stored in the PAM 23. The pieces of identification information correspond to all the sticky notes constituting the series of connected sticky notes. The CPU 21 sets a variable (index) "i" to zero (i=0) (Step S112). The variable i represents the number of sticky notes constituting the series of connected sticky notes. The initial value of the variable i is zero (0) and corresponds to the ordinal number in the connection order of the first sticky note in the series of connected sticky notes. The other values in ascending order of the variable i correspond to the ordinal numbers in the connection order of the other sticky notes.

The CPU 21 determines the position of the (i+1) sticky note that corresponds to the variable (i+1) with respect to the position of the (i) sticky note that corresponds to the variable i (Step S113). The CPU 21 determines the position of the (i+1) sticky note, based on the sticky note information of the (i) sticky note and the (i+1) sticky note stored in the PAM 23 (size, shape, and positional information).

Hereinafter, an example of how to determine the relative position of a sticky note in Step S113 is described with reference to FIG. 13. Herein, the relative position is determined from among eight directions (up, upper right, right, lower right, below, lower left, left, upper left), for example.

As shown in FIG. 13, relative positions of sticky notes P(i+1)a, P(i+1)b, and P(i+1)c with respect to the sticky note Pi are considered. The sticky notes P(i+1)a, P(i+1)b, and P(i+1)c each correspond to the variable (i+1), and the sticky note Pi corresponds to the variable i. For plain explanation, nine cells having the equal size are illustrated, and the sticky note P1 is in the central cell. The size of the sticky note Pi corresponds to the cell size. The sticky note P1 is larger than the sticky notes P(i+1)a, P(i+1)b, and P(i+1)c. The sticky notes have the same shape (rectangle).

The relative position of the sticky note P(i+1) with respect to the position of the sticky note Pi is determined based on the positions of cells. For example, the central point of the sticky note P(i+1)a, which is calculated based on the coordinates of the respective sides of the sticky note P(i+1)a, is in the cell right to the sticky note Pi. Therefore, the relative position of the sticky note P(i+1)a with respect to the sticky note Pi is determined as "right". For another example, the central point of the sticky note P(i+1)b, which is calculated based on the coordinates of the respective sides of the sticky note P(i+1)b, is in the upper left cell to the sticky note Pi. Therefore, the relative position of the sticky note P(i+1)b with respect to the sticky note Pi is determined as "upper left". For another example, the central point of the sticky note P(i+1)c, which is calculated based on the coordinates of the respective sides of the sticky note P(i+1)c, is in the cell of the sticky note Pi. The line extending from the central point of the sticky note Pi to the central point of the sticky note P(i+1)c extends toward the lower-right cell. Therefore, the relative position of the sticky note P(i+1)c with respect to the sticky note Pi is determined as "lower right".

The CPU 11 stores, in the RAM 23, the relative position (determined in Step S113) of the (i+1) sticky note with respect to the (i) sticky note in association with the ordinal number in the connection order of the (i+1) sticky note (Step S114). The CPU 21 determines whether "variable (i+1)=n" stands (Step S115).

When "variable (i+1)=n" does not stand (Step S115: NO), the CPU 21 increments the variable i by 1 (Step S116) and proceeds to Step S113. When "variable (i+1)=n" stands (Step S115: YES), the process for obtaining relative positions of sticky notes ends.

In FIG. 11, Steps S97 to S106 are the same as Steps S76 to S85 of the fourth notebook creation process in FIG. 10. The CPU 21 performs the process for adjusting sticky notes and connecting lines (Step S107). In this process, the CPU 21 adjusts the connecting lines and the positions of the series of connected sticky notes in which the order and positions are changed (Step S107). The process for adjusting sticky notes and connecting lines is described with reference to FIG. 13.

As shown in FIG. 13, the CPU 21 obtains the number [n] of sticky notes constituting the displayed series of connected sticky notes (Step S121). The number of sticky notes is obtained as the number of pieces of identification information in the sticky note information stored in the RAM 23. The pieces of identification information corresponds to all the sticky notes constituting the series of connected sticky notes. The CPU 21 sets a variable (index) "j" to zero ("j=0") (Step 3122). The variable j represents the number of sticky notes to be changed. The initial value of the variable j is zero (0) and corresponds to the ordinal number in the connection order of the first sticky note in the series of connected sticky notes. The other values in ascending order of the variable j correspond to the ordinal numbers in the connection order of the other sticky notes.

The CPU 21 adjusts the position of the sticky note corresponding to the variable (j+1) (hereinafter called the (j+1) sticky note) with respect to the sticky note corresponding to the variable j (hereinafter called the j sticky note), based on the relative position of the ordinal number of the (j+1) sticky note with respect to the j sticky note (Step S123). For example, when the relative position of the (j+1) sticky note is "up", "below", "left", or "right" (hereinafter called the first direction) with respect to the j sticky note, the position of the (j+1) sticky note with respect to the j sticky note is adjusted such that the line connecting the middle point of a side of the j sticky note to the middle point of a side of the (j+1) sticky note extends in the first direction. Herein, a side of the j sticky note and a side of the (j+1) sticky note face each other and are closest to each other. For another example, when the relative position of the (j+1) sticky note is "upper right", "lower right", "lower left", or "upper left" (i.e., diagonal direction, hereinafter called the second direction) with respect to the j sticky note, the position of the (j+1) sticky note with respect to the j sticky note is adjusted such that the line connecting the central point of the j sticky note to the central point of the (j+1) sticky note extends in the second direction.

The CPU 21 adjusts the connecting line that connects the j sticky note to the (j+1) sticky note and the positional information of the (j+1) sticky note such that the connecting line connecting the j sticky note to the (j+1) sticky note has a predetermined length (Step S124). The CPU 21 reflects the positional information of the (j+1) sticky note, which is adjusted in Steps S123 and S124, on the sticky note information of the (j+1) sticky note; the CPU 21 reflects the length and direction of the connecting line, which is adjusted in Step S124, on the connecting line information of the connecting line connecting the j sticky note to the (j+1) sticky note; and the CPU 21 stores the changed sticky note information and connecting line information in PAM 23 (Step S125).

The CPU 21 determines whether "variable (j+1)=n" stands (Step S126). When "variable (j+1)=n" does not stand (Step S126: NO), the CPU 21 increments the variable j by 1 (Step S127) and proceeds to Step S123. When "variable (j+1)=n" stands (Step S126: YES), the process for adjusting sticky notes and connecting lines ends.

In FIG. 11, Step S108 is the same as Step S86 of the fourth notebook creation process in FIG. 10.

For example, in the process for adjusting sticky notes and connecting lines, consider the case where (i) five sticky notes P11, P12, P13, P14 and P15 connected by connecting lines C31, C32, C33, and C34 are displayed as a series of connected sticky notes, as shown in FIG. 15A and (ii) the order of the sticky notes P12, P13, and P14 is changed. Herein, the sticky notes P11 to P15 have the same rectangular shape with different sizes.

The connecting line C31 connects the sticky note P11 to the sticky note P12 in the direction from P11 to P12. The connecting line C32 connects the sticky note P12 to the sticky note P13 in the direction from P12 to P13. The connecting line C33 connects the sticky note P13 to the sticky note P14 in the direction from P13 to P14. The connecting line C34 connects the sticky note P14 to the sticky note P15 in the direction from P14 to P15.

In Steps S99 and S100, consider the case where the sticky note P12 is selected as the change-start sticky note and the sticky note P14 is selected as the change-end sticky note. In the case, as shown in the notebook N2 in FIG. 15B, the positions of the sticky notes P11 to P15 are changed and adjusted such that they are connected in the order of P11, P14, P13, P12, P15; and the connecting lines C31, C32, C33, and C34 are changed to connecting lines C41, C42, C43, and C44.

The connecting line C41 connects the sticky note P11 to the sticky note P14 in the direction from P11 to P14. The connecting line C42 connects the sticky note P14 to the sticky note P13 in the direction from P14 to P13. The connecting line C43 connects the sticky note P13 to the sticky note P12 in the direction from P13 to P12. The connecting line C44 connects the sticky note P12 to the sticky note P15 in the direction from P12 to P15. The connecting lines C41 to C44 have the same length.

The notebook N2 of FIG. 15A shows the state before the order is changed. In the notebook N2 of FIG. 15A, the relative position of the sticky note P12 with respect to the sticky note P11, which comes first in the connection order, is "right"; the relative position of the sticky note P13 with respect to the sticky note P12, which comes second in the connection order, is "below"; the relative position of the sticky note P14 with respect to the sticky note P13, which comes third in the connection order, is "right"; and the relative position of the sticky note P15 with respect to the sticky note P14, which comes fourth in the connection order, is "right".

The notebook N2 of FIG. 15B shows the state after the order is changed. In the notebook N2 of FIG. 15B, the relative position of the sticky note P14 with respect to the sticky note P11, which comes first in the connection order, is adjusted to "right"; the relative position of the sticky note P13 with respect to the sticky note P14, which comes second in the connection order, is adjusted to "below"; the relative position of the sticky note P12 with respect to the sticky note P13, which comes third in the connection order, is adjusted to "right"; and the relative position of the sticky note P15 with respect to the sticky note P12, which comes fourth in the connection order, is adjusted to "right". Thus, the relative position of a (j+1) sticky note with respect to a j sticky note (j: 1 to 5 in the connection order) is unchanged before and after the connection order is changed. Thus, the sticky notes P11 to P15 constituting the series of connected sticky notes are rearranged in a different order without overlapping with each other.

As described above, according to the fifth embodiment, the CPU 21 rearranges (i) the change-start sticky note and the change-end sticky note or (ii) the change-start sticky note, the change-end sticky note, and the other (different) sticky notes, such that relative positions between these sticky notes are unchanged (retained) before and after the connection order by the connecting lines is changed. Such a configuration can avoid overlapping of sticky notes after changing the connection order of sticky notes connected by connecting lines having directions. This allows the user to easily view the connection among sticky notes constituting the series of connected sticky notes.

Further, the CPU 21 sets the length of the connecting lines having directions to a predetermined length. Such a configuration can further avoid overlapping of sticky notes after changing the connection order of sticky notes, which are connected by connecting lines having directions. This allows the user to easily view the connection among sticky notes constituting the series of connected sticky notes.

The fifth notebook creation process adjusts the connecting lines and the positions of sticky notes in addition to the fourth notebook creation process. However, the present invention is not limited to this. Adjusting of the connecting lines and the positions of sticky notes may also be performed in the second notebook creation process.

In the above description, the storage 25 (HDD and/or SSD) is used as a computer-readable medium that stores the programs of the present invention. However, the computer readable medium is not limited to this example. As other computer-readable storage media, a flash memory and a portable storage medium (e.g., a CD-ROM) can also be used. Further, a carrier wave may be used as a medium to provide data of the programs of the present invention via a communication line.

The embodiments described above are examples of the information processing apparatus, the display control method, and the storage medium of the present invention and do not limit the present invention. For example, at least two among the first to fifth embodiments may be combined.

In the first to fifth embodiments, the PC 20 as the information processing apparatus performs the first to fifth notebook creation processes received from the server 10; creates a notebook based on the operation information input by the user's manipulation of the operation receiver 22; and sends the notebook information to the server 10 to store the information. However, the present invention is not limited to this configuration. For example, the server 10 as an information processing apparatus may perform the same processes as the first to fifth notebook creation processes; receive operation information input by the user's manipulation of the operation receiver 22 from the PC 20; create a notebook based on the operation information; and store the notebook information in the storage 15. For another example, the PC 20 as a stand-alone information processing apparatus may perform the same processes as the first to fifth notebook creation processes in accordance with a program (s) stored in the storage 25; create a notebook based on operation information input by the user's manipulation of the operation receiver 22; and store the notebook information in the storage 25.

In the first and second embodiments, the tracing input, by which sticky notes are traced, is done by dragging the mouse of the operation receiver 22. However, the present invention is not limited to this. For example, when the operation receiver 22 has a touchscreen, the tracing input of sticky notes may be done by dragging the user's finger or a touch pen on the touchscreen.

In the first to fifth embodiments, sticky notes are used as connectable objects. However, the present invention is not limited to this configuration. Other objects, such as icons and windows, may also be used. In the first to fifth embodiments, objects are used for learning support. However, the present invention is not limited to this. Objects for other purposes (e.g., business, events, travels) may also be used.

Although the embodiments of the present invention have been described, the scope of the present invention is not limited to the embodiments described above but encompasses the scope of the invention recited in the claims and the equivalent thereof.

The invention claimed is:

1. An information processing apparatus comprising:
at least one processor that:
displays a plurality of objects and connecting lines on a display, each of the connecting lines defining a connection order of the objects as a direction and connecting the objects one to one; and
in response to receiving selection of only two objects from among the plurality of objects, where a first object of the two objects is designated as a change-start object, and a second object of the two objects is designated as a change-end object:
in a case where no object is displayed between the two objects, obtains a connection order of the two objects connected by a connecting line, reverses the connection order, changes a displayed direction of the connecting line connecting the two objects in accordance with the reversed connection order, changes display positions of the two objects in accordance with the reversed connection order, and displays the two objects on the display at the changed display positions, and
in a case where another object is displayed between the two objects, obtains a connection order of the two objects and the another object connected by the connecting lines, reverses the connection order, changes a displayed direction of the connecting lines connecting the two objects and the another object in accordance with the reversed connection order, changes display positions of the two objects and the another object in accordance with the reversed connection order, and displays the two objects and the another object on the display at the changed display positions.

2. The information processing apparatus according to claim 1,
wherein in the case where no object is displayed between the two objects, the processor changes the display positions of the two objects such that relative positions among the two objects are unchanged before and after the connection order is reversed, and displays the two objects on the display at the changed display positions, and
wherein in the case where the another object is displayed between the two objects, the processor changes the display positions of the two objects and the another object such that relative positions among the two objects and the another object are unchanged before and after the connection order is reversed, and displays the two objects and the another object on the display at the changed display positions.

3. The information processing apparatus according to claim 2,
wherein in the case where no object is displayed between the two objects, the processor sets a length of the connecting line that connects the two objects to a predetermined length so that the displayed two objects do not overlap on the display, and
wherein in the case where the another object is displayed between the two objects, the processor sets lengths of the connecting lines that connect the two objects and the another object to predetermined lengths so that the two objects and the another object do not overlap on the display.

4. A display control method for a computer, the method comprising:
displaying a plurality of objects and connecting lines on a display, each of the connecting lines defining a connection order of the objects as a direction and connecting the objects one to one; and
in response to receiving selection of only two objects from among the plurality of objects, where a first object of the two objects is designated as a change-start object, and a second object of the two objects is designated as a change-end object:
in a case where no object is displayed between the two objects: obtaining a connection order of the two objects connected by a connecting line; reversing the connection order; changing a displayed direction of the connecting line connecting the two objects in accordance with the reversed connection order; changing display positions of the two objects in accordance with the reversed connection order; and displaying the two objects on the display at the changed display positions; and
in a case where another object is displayed between the two objects: obtaining a connection order of the two objects and the another object connected by the connecting lines; reversing the connection order; changing a displayed direction of the connecting lines connecting the two objects and the another object in accordance with the reversed connection order; changing display positions of the two objects and the another object in accordance with the reversed connection order; and displaying the two objects and the another object on the display at the changed display positions.

5. A nontransitory computer-readable storage medium storing a program that causes a computer to:
display a plurality of objects and connecting lines on a display, each of the connecting lines defining a connection order of the objects as a direction and connecting the objects one to one; and
in response to receiving selection of only two objects from among the plurality of objects, where a first object of the two objects is designated as a change-start object, and a second object of the two objects is designated as a change-end object:
in a case where no object is displayed between the two objects, obtain a connection order of the two objects connected by a connecting line; reverse the connection order; change a displayed direction of the connecting line connecting the two objects in accordance with the reversed connection order; change display positions of the two objects in accordance with the reversed connection order; and display the two objects on the display at the changed display positions, and in a case where another object is displayed between the two objects, obtain a connection order of the two objects and the another object connected by the connecting lines; reverse the connection order; change a displayed direction of the connecting lines connecting the two objects and the another object in accordance with the reversed connection order; change display positions of the two objects and the another object in accordance with the reversed connection order; and display the two objects and the another object on the display at the changed display positions.

* * * * *